United States Patent
Hao et al.

(10) Patent No.: US 12,101,151 B2
(45) Date of Patent: Sep. 24, 2024

(54) NUMBER OF NON-ZERO COEFFICIENTS REPORTING FOR TYPE II CSI CODEBOOK WITH FREQUENCY COMPRESSION

(71) Applicant: QUALCOMM Incorporated, San Diego, CA (US)

(72) Inventors: Chenxi Hao, Beijing (CN); Chao Wei, Beijing (CN); Yu Zhang, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/310,748

(22) PCT Filed: Feb. 22, 2020

(86) PCT No.: PCT/CN2020/076308
§ 371 (c)(1),
(2) Date: Aug. 20, 2021

(87) PCT Pub. No.: WO2020/173402
PCT Pub. Date: Sep. 3, 2020

(65) Prior Publication Data
US 2022/0109480 A1   Apr. 7, 2022

(30) Foreign Application Priority Data

Feb. 25, 2019 (WO) ................ PCT/CN2019/076043

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/063* (2013.01); *H04B 7/0639* (2013.01); *H04B 7/0695* (2013.01)

(58) Field of Classification Search
CPC .... H04B 7/0626; H04B 7/0417; H04B 7/063; H04B 7/0639; H04B 7/0695
See application file for complete search history.

(56) References Cited

U.S. PATENT DOCUMENTS 9,374,193 B2   6/2016   Abraham et al.
10,200,103 B2   2/2019   Rahman et al.
(Continued)

FOREIGN PATENT DOCUMENTS

CN    108259154 A    7/2018
CN    108271265 A    7/2018
(Continued)

OTHER PUBLICATIONS

Huawei et al., "Discussion on CSI Enhancement for MU-MIMO", 3GPP TSG RAN WG1 Meeting #94bis, R1-1810103, 3rd Generation Partnership Project, Mobile Competence Centre, 650, Route Des Lucioles, F-06921 Sophia-Antipolis Cedex France, vol. RAN WG1, No. Chengdu, China, Oct. 8, 2018-Oct. 12, 2018 Sep. 29, 2018, XP051517518, 10 Pages, pp. 2,4,5,7—p. 8, Figure 3, Sections 3, 4, pp. 2-8.

(Continued)

*Primary Examiner* — Derrick V Rose
(74) *Attorney, Agent, or Firm* — QUALCOMM Incorporated

(57) ABSTRACT

Certain aspects of the present disclosure provide techniques for channel state information (CSI) reporting with frequency compression. A method that can be performed by a user equipment (UE) includes receiving a CSI report configuration. The CSI report configuration configures the UE for reporting precoding matrix information including, for each layer, a plurality of selected beams L, a plurality of frequency domain compression bases F for the L beams, and a subset of linear combination coefficients associated with the frequency domain compression bases and beams. The UE (Continued)

can determine a number of coefficients to report for a higher rank based on a configured maximum number of coefficients to report for a lower rank.

25 Claims, 11 Drawing Sheets

(56) References Cited

U.S. PATENT DOCUMENTS

| | | | |
|---|---|---|---|
| 10,826,577 | B2 | 11/2020 | Wei et al. |
| 2018/0167116 | A1* | 6/2018 | Rahman ............... H04B 7/0478 |
| 2018/0227028 | A1 | 8/2018 | Lee |
| 2019/0253181 | A1* | 8/2019 | Rahman ............... H04B 7/0639 |
| 2019/0334587 | A1* | 10/2019 | Rahman ............... H04B 7/0486 |
| 2022/0077911 | A1* | 3/2022 | Sergeev ............... H04B 7/0658 |
| 2024/0030967 | A1* | 1/2024 | Rahman ............... H04L 5/0051 |

FOREIGN PATENT DOCUMENTS

| | | |
|---|---|---|
| CN | 108352918 A | 7/2018 |
| WO | 2012044866 | 4/2012 |

OTHER PUBLICATIONS

Intel Corporation: "Discussion on Type II CSI Compression", 3GPP TSG RAN WG1 #95, R1-1813871 CSI Enhancements_R2, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, XP051555778, 10 Pages, Section 2.2, pp. 2-6, Figures 1, 2, 5.

Qualcomm Incorporated: "CSI Enhancement for MU-MIMO Support", 3GPP TSG RAN WG1 Meeting #96, R1-1903042, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 16, 2019, XP051600738, 15 Pages, Section 6.1, pp. 9-10.

Supplementary European Search Report—EP20762511—Search Authority—Munich—Oct. 21, 2022.

International Search Report and Written Opinion—PCT/CN2019/076043—ISA/EPO—Nov. 12, 2019.

International Search Report and Written Opinion—PCT/CN2020/076308—ISAEPO—May 8, 2020.

Nokia, et al., "CSI Feedback Overhead Reduction for MU-MIMO Enhancements," R1-1813488, 3GPP TSG RAN WG1 Meeting #95, Spokane, USA, Nov. 12-16, 2018, 10 pages, section 2.

Qualcomm Incorporated: "CSI Enhancement for MU-MIMO Support," R1-1813441, 3GPP TSG RAN WG1 Meeting #95, Nov. 12-16, 2018, Spokane, U.S.A., Nov. 3, 2018, sections 1-7, 10 Pages.

* cited by examiner

NUMBER OF NON-ZERO COEFFICIENTS REPORTING FOR TYPE II CSI CODEBOOK WITH FREQUENCY COMPRESSION

CROSS REFERENCE TO RELATED APPLICATIONS

This application is a national stage application under 35 U.S.C. 371 of PCT/CN2020/076308, filed Feb. 22, 2020, which claims benefit of and priority to International Application No. PCT/CN2019/076043, filed Feb. 25, 2019, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for number of non-zero coefficients reporting for channel state information (CSI) reporting with frequency compression.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide another method for wireless communication by a user equipment (UE). The method generally includes receiving a channel state information (CSI) report configuration. The CSI report configuration configures the UE for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The method includes determining a second maximum number of linear combination coefficients to report for a second one or more ranks, higher than the first one or more ranks, based on a ratio of the first maximum number of linear combination coefficients.

Certain aspects provide another method for wireless communication by a base station (BS). The method generally includes sending a CSI report configuration to a UE, configuring a UE for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The method includes determining a second maximum number of linear combination coefficients for a second one or more ranks, higher than the first one or more ranks, based on a ratio of the first maximum number of linear combination coefficients.

Certain aspects provide another apparatus for wireless communication. The apparatus generally includes means for receiving a CSI report configuration. The CSI report configuration configures the apparatus for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The apparatus includes means for determining a second maximum number of linear combination coefficients to report for a second one or more ranks, higher than the first one or more ranks, based on a ratio of the first maximum number of linear combination coefficients.

Certain aspects provide another apparatus for wireless communication. The apparatus generally includes means for sending a CSI report configuration to another apparatus, configuring the another apparatus for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The apparatus includes means for determining a second maximum number of linear combination coefficients for a second one or more ranks, higher than the first one or more ranks, based on a ratio of the first maximum number of linear combination coefficients.

Certain aspects provide another apparatus for wireless communication. The apparatus generally includes a receiver configured to receive a CSI report configuration. The CSI report configuration configures the apparatus for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The apparatus includes at least one processor coupled with a memory and configured to determine a second maximum number of linear combination coefficients to report for a second one or more ranks, higher than the first one or more ranks, based on a ratio of the first maximum number of linear combination coefficients.

Certain aspects provide another apparatus for wireless communication. The apparatus generally includes a transmitter configured to send a CSI report configuration to another apparatus, configuring the another apparatus for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The apparatus includes at least one processor coupled with a memory and configured to determine a second maximum number of linear combination coefficients for a second one or more ranks, higher than the first one or more ranks, based on a ratio of the first maximum number of linear combination coefficients.

Certain aspects provide a computer readable medium having computer executable code stored thereon for wireless communication. The computer readable medium generally includes code for receiving a CSI report configuration. The CSI report configuration configures a UE for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The computer readable medium includes code for determining a second maximum number of linear combination coefficients to report for a second one or more ranks, higher than the first one or more ranks, based on a ratio of the first maximum number of linear combination coefficients.

Certain aspects provide a computer readable medium having computer executable code stored thereon for wireless communication. The computer readable medium generally includes code for sending a CSI report configuration to a UE, configuring a UE for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks. The computer readable medium includes code for determining a second maximum number of linear combination coefficients for a second one or more ranks, higher than the first one or more ranks, based on a ratio of the first maximum number of linear combination coefficients.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
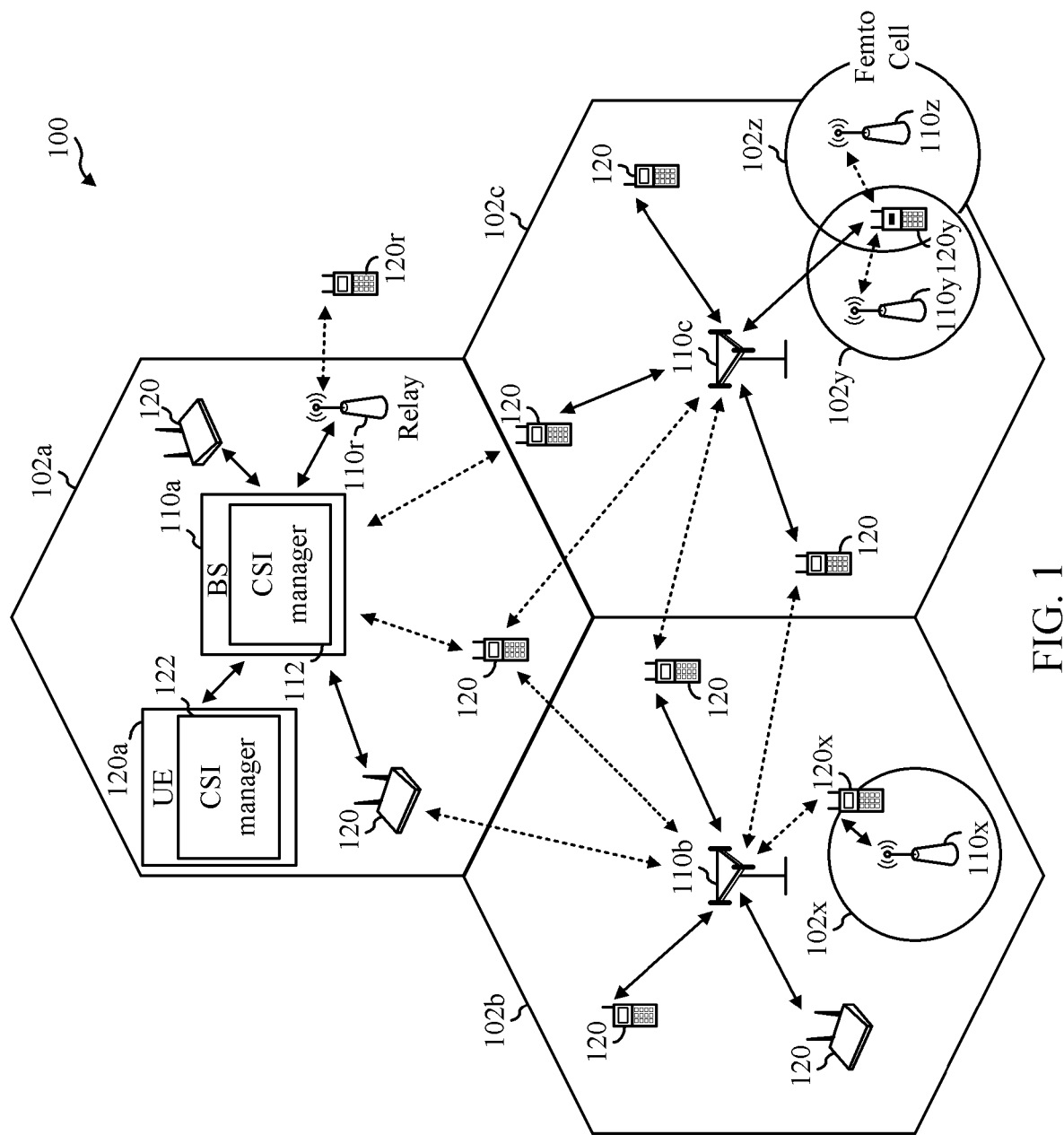
FIG. 1 is a block diagram conceptually illustrating an example wireless communication network, in accordance with certain aspects of the present disclosure.
Figure 1:
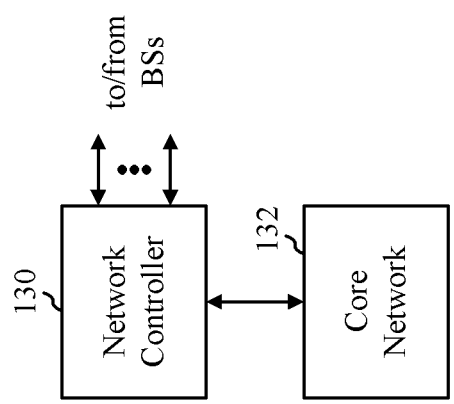

Aspects of the present disclosure provide apparatus, methods, processing systems, and computer readable mediums for channel state information (CSI) reporting with frequency compression.

In certain systems, such as certain new radio systems (e.g., Release 16 5G NR systems), a user equipment (UE) can report CSI feedback with frequency compression, such as to save the overhead used for the linear combination codebook (e.g., the Type II CSI codebook). A frequency domain compression based codebook may be used. The linear combination coefficients may be compressed in the frequency domain using a discrete Fourier transform (DFT) basis. After the compression, the coefficients may be quantized (e.g., in the time domain) and reported. For each beam, the strongest coefficients may be reported with a higher resolution (e.g., using more bits), while other coefficients are reported with a lower resolution (e.g., using less bits).

To further reduce overhead, the UE may report only a subset of the linear combination coefficients, which may be smaller than the configured number of coefficients. The UE may report the actual total number of reported non-zero coefficients in the first part of uplink control information (UCI). Thus, the reported actual number of coefficients can determine/indicate the payload in the second part UCI, in which the quantized linear combination coefficients are included. However, since a beam can be associated with no non-zero linear combination coefficients, then there is no strongest coefficient for that beam. In this case, the total number of strongest linear combination coefficients would vary given a certain total number of non-zero linear combination coefficients.

Aspects of the present disclosure provide for reporting the total number of non-zero linear combination coefficients across all layers, and further reporting a total number of zero beams across all layers or including zero padding bits in the second part UCI based on the number of zero beams across all layers. Thus, the payload size can be kept constant, even when some beams do not have a strongest linear combination coefficient.

Aspects of the present disclosure provide for determining a maximum number of linear combination coefficients for higher ranks based on a maximum number of linear combination coefficients for lower ranks.

The rank may depend on antenna configuration. The rank may indicate the number of supported layers. The rank may be based on the channel as well as the number of antennas at the BS and the UE and the correlation of the antennas (or interference caused to each other). The transmission mode may be based on the rank. The maximum rank may be based on the number of transmit and receive antennas at the UE and BS.

In some cases, for higher ranks (e.g., greater than rank-2) to have a comparable payload to lower ranks, the maximum number of coefficients per layer for the higher rank may be lower. Thus, the number of per-layer coefficients for a higher rank (e.g., such as rank-3 or rank-4) may be derived based on the number of per-layer coefficients for a lower rank and a ratio. The ratio may be configured by the network or derived by the UE. The ratio may be ratio of the higher rank to the lower rank.

The following description provides examples of number of non-zero linear combination coefficient reporting for CSI with frequency compression, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, new radio (e.g., 5G NR) RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other later generation-based communication systems.

5G NR may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

5G NR may support beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells. A network controller 130 may couple to a set of BSs 110 and provide coordination and control for these BSs 110. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., such as the relay 110r). A relay station is a station that receives a transmission of data and/or other information from an upstream station (e.g., a BS 110a or a UE 120r) and sends a transmission of the data and/or other information to a downstream station (e.g., a UE 120r or a BS 110a). A relay station may also be a UE 120 that relays transmissions for other UEs 120.

The UEs 120 and BSs 110 may be configured for number of non-zero coefficient reporting for CSI with frequency compression, in accordance with aspects of the present disclosure. For example, the wireless communication network 100 may be a 5G NR network. As shown in FIG. 1, the UE 120a has a CSI manager 122 and the BS 110a has a CSI manager 112. The CSI manager 112 may be configured to send, and the CSI manager 122 to receive, a CSI report configuration. The CSI report configuration configures the UE 120a for CSI reporting. For example, the CSI report configuration configures the UE 120a to report precoding matrix information, including, for each layer, a plurality of selected beams L, a frequency domain compression matrix F for each of the L beams at each of a plurality of taps M in the time domain, and a subset of linear combination coefficients associated with the frequency domain compression matrices and beams. The CSI manager 122 may be configured to report, and the CSI manager 112 to receive, in a first part of uplink control information (UCI), a total number of non-zero linear combination coefficients across all layers. The CSI manager 122 and/or the CSI manager 112 may be configured to determine a payload size of a second part of the UCI based, at least in part, on the reported total numbers of non-zero linear combination coefficients. The CSI manager 122 and/or the CSI manager 112 may be configured to determine a second maximum number of linear combination coefficients for a second one or more ranks based on a configured maximum number of linear combination coefficients for a first one or more ranks, lower than the second one or more ranks.

Figure 2:
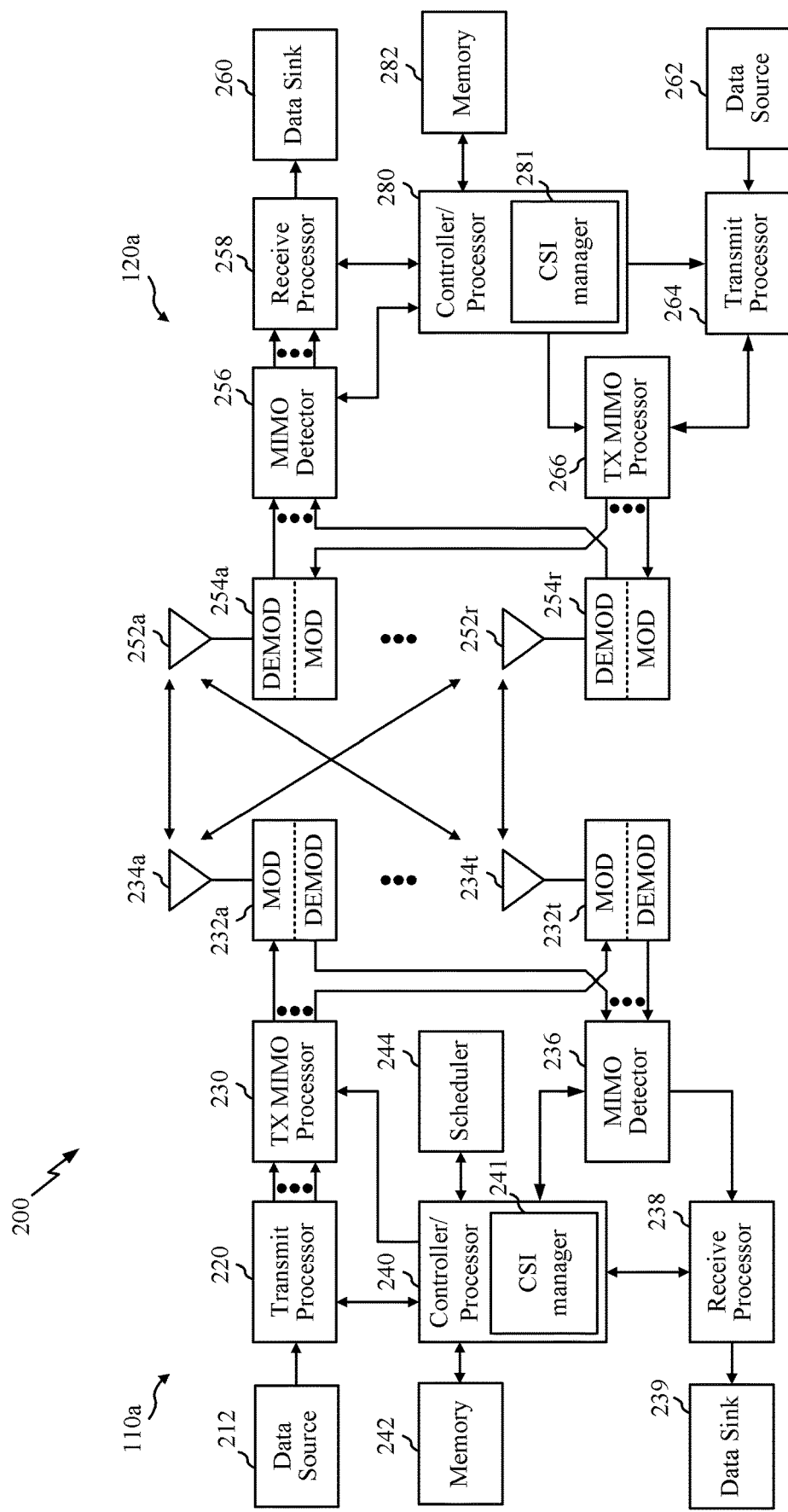
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, such as for the primary synchronization signal (PSS), secondary synchronization signal (SSS), and channel state information reference signal (CSI-RS). A transmit (TX) multiple-input multiple-output (MIIVIO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the processor 240 has a CSI manager 241 and the processor 480 has a CSI manager 281 that may be configured for number of coefficients reporting for CSI with frequency compression, according to aspects described herein.

NR may utilize orthogonal frequency division multiplexing (OFDM) with a cyclic prefix on the uplink and/or downlink and/or single-carrier frequency division multiplexing (SC-FDM) on the uplink and/or downlink. NR may support half-duplex operation using time division duplexing (TDD). OFDM and SC-FDM partition the system bandwidth into multiple orthogonal subcarriers, are referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. A resource block (RB) may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Figure 3:
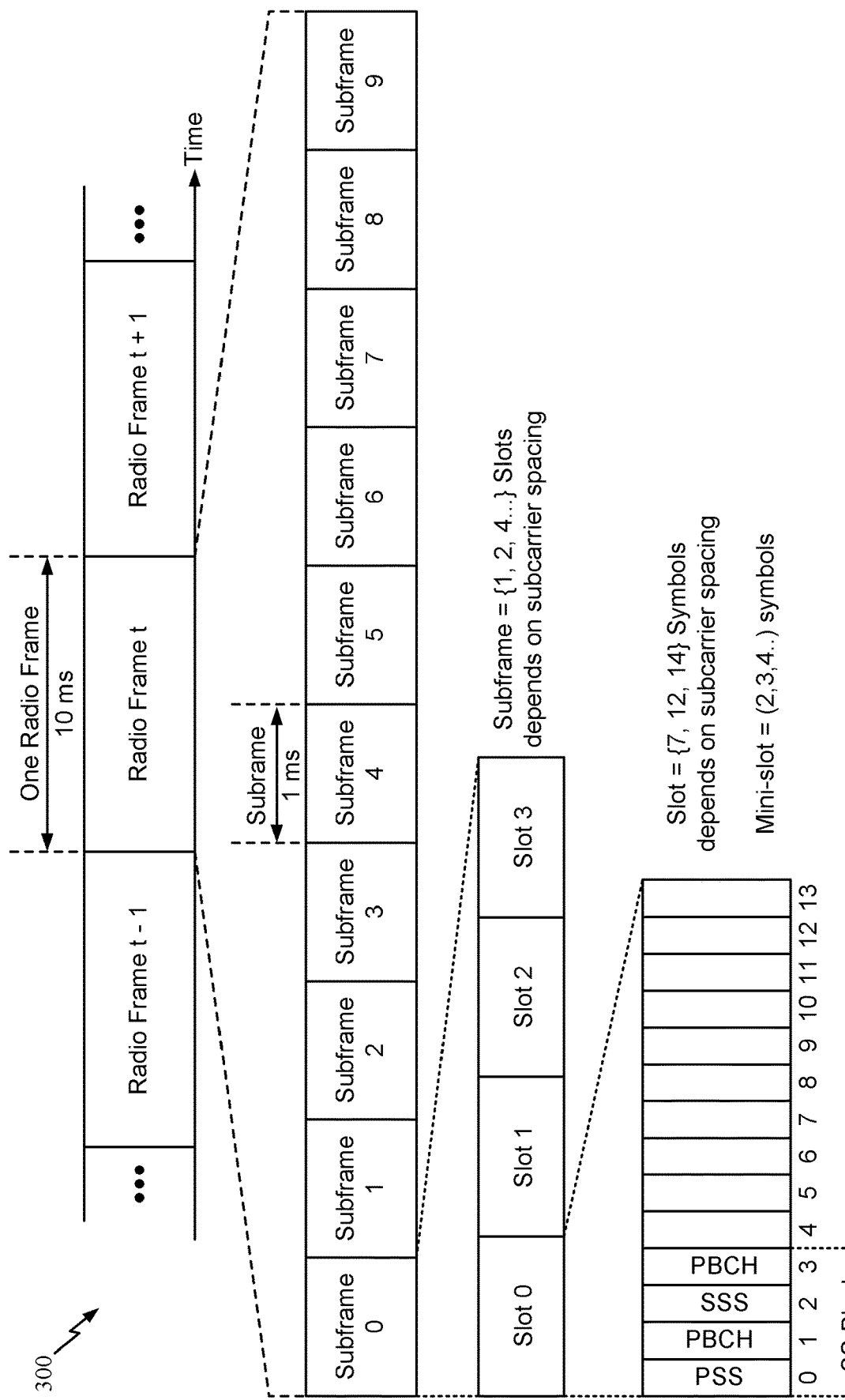
FIG. 3 illustrates an example of a frame format for a certain wireless communication systems, in accordance with certain aspects of the present disclosure.

FIG. 3 is a diagram showing an example of a frame format 300 (e.g., for NR). The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP.

The network (e.g., a BS), may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. Three codebooks include Type I single panel, Type I multi-panel, and Type II single panel. Regardless which codebook is used, the CSI report may include the CQI, PMI, CRI, and/or RI. The structure of the PMI may vary based on the codebook. The CRI, RI, and CQI may be in a first part (Part I) and the PMI may be in a second part (Part II) of the CSI report. For the Type I single panel codebook, the PMI may consist of a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

As discussed above, a user equipment (UE) may be configured for channel state information (CSI) reporting, for example, by receiving a CSI configuration. In certain systems (e.g., Release 15 5G NR), the UE may be configured to report at least a Type II precoder across configured frequency domain (FD) units. For example, the precoder matrix W includes the $W_1$ matrix, reporting a subset of selected beams using spatial compression) and the $W_2$ matrix, reporting (for cross-polarization) the linear combination coefficients for the selected beams (2L) across the configured FD units:

$$w_r = \sum_{i=0}^{2L-1} b_i \cdot c_i,$$

where $$c_i = \left[ \underbrace{c_{i,0} \quad \cdots \quad c_{i,N_3-1}}_{N_3} \right],$$

where $b_i$ is the selected beam, $c_i$ is the set of linear combination coefficients, L is the number of selected spatial beams, and $N_3$ corresponds to the number of frequency units (e.g., subbands, resource blocks (RBs), etc.). The precoder is based on a linear combination of DFT beams. The Type II codebook may improve MU-MIMO performance. The $W_2$ matrix has size $2L \times N_3$.

In certain systems (e.g., Rel-16 5G NR), the UE may be configured to report frequency domain compressed precoder feedback to reduce overhead for the CSI report. The precoder matrix with FD compression may use a FD compression matrix to compress the $W_2$ matrix size to $2L \times M$, where $M < N_3$ as $W = W_1 \tilde{W}_2 W_f^H$, where the precoder matrix W has $P = 2N_1N_2$ rows (spatial domain, number of ports) and $N_3$ columns (frequency-domain compression unit, consisting of RBs or reporting subbands). The $\tilde{W}_2$ matrix consists of the linear combination coefficients (amplitude and co-phasing), where each element represents the coefficient of a tap for a beam. The $W_f^H$ matrix is composed of the basis vectors (each row is a basis vector) used to perform compression in frequency domain. In some examples, the basis vectors in $W_f$ are derived from a certain number of columns in a DFT matrix. In the matrix of $\tilde{W}_2$, one row corresponds to one spatial beam in $W_1$, and one entry therein represents the coefficient of one tap for this spatial beam. An entry in $\tilde{W}_2$ corresponds to a row of $W_f^H$, i.e. a column of $W_f$.

Figure 4:
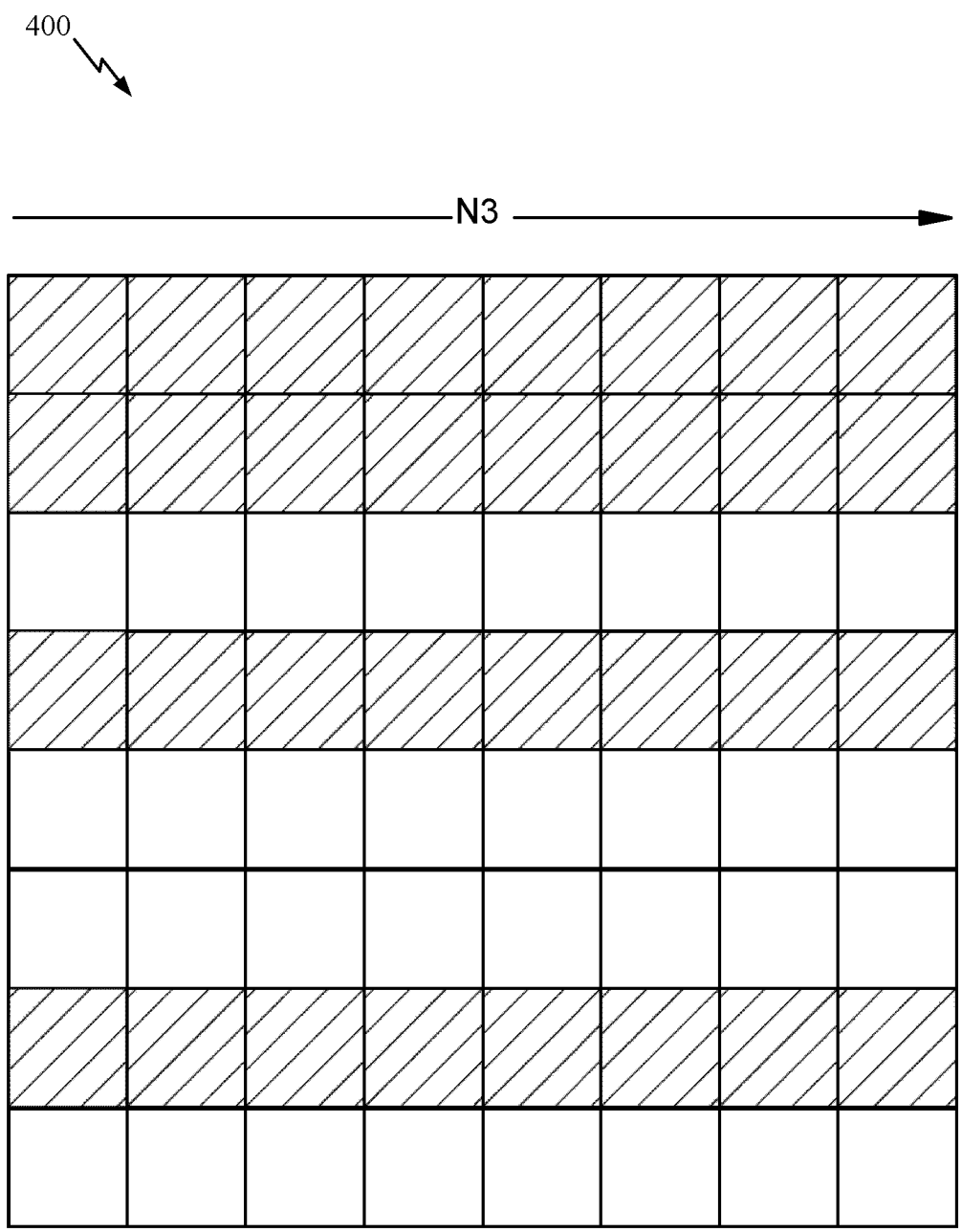
FIG. 4 is an example matrix illustrating basis selection for channel state information (CSI) reporting, in accordance with certain aspects of the present disclosure.
Figure 5:
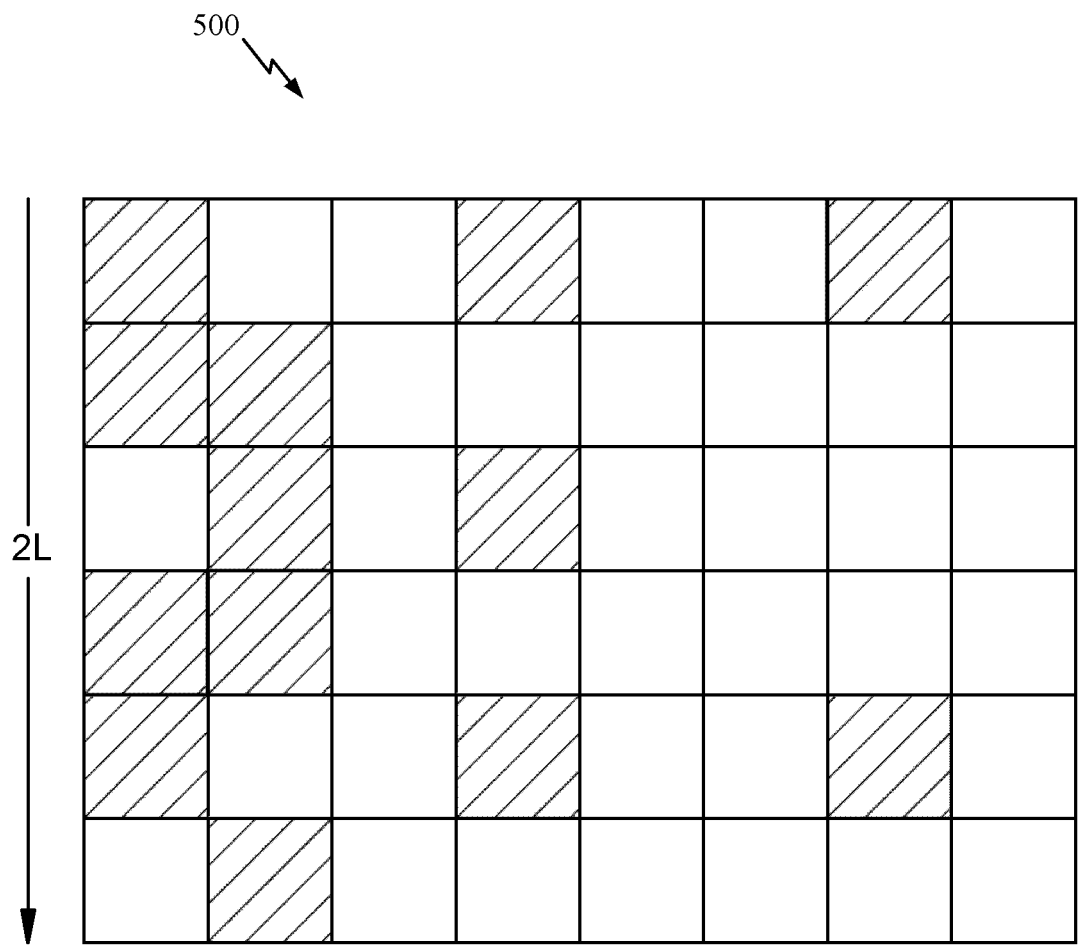
FIG. 5 is an example matrix illustrating a linear combination coefficient subset for CSI reporting, in accordance with certain aspects of the present disclosure.

The precoder matrix may be given by:

$$w_r = \sum_{i=0}^{2L-1} b_i \tilde{c}_i \cdot F_i^H,$$

where the discrete Fourier transform (DFT) compression basis is given by:

$$F_i^H = \begin{bmatrix} f_{i,0}^H \\ f_{i,1}^H \\ \vdots \\ f_{i,N_3-1}^H \end{bmatrix} \text{ of size } M_i \times N_3,$$

where $M_i$ is dimension of the compressed domain. In some examples, $F_i^H$ is common to all i, where a same basis matrix is applied to all beams for a given layer, and the number of coefficients is M for each beam. The coefficients are given by:

$$\tilde{c}_i = \begin{bmatrix} \underbrace{\tilde{c}_{i,0} \cdots \tilde{c}_{i,M_i-1}}_{M_i} \end{bmatrix},$$

and the dimension of the compressed domain is $M_i<N_3$. As discussed in more detail below, the number of non-zero coefficients for each may be smaller than M As shown in FIG. 4, the UE may report a subset of selected basis of the $W_f^H$ matrix. As shown in FIG. 5, the CSI report configures the UE to report a subset $K_0<2LM$ of the total linear combination coefficients of the $\tilde{W}_2$ matrix.

Thus, for CSI feedback with Type-II codebook for FD compressed PMI feedback, the PMI feedback is composed of the beam selection in the matrix $W_1$, the amplitude and phase coefficient values of each entry in the matrix $\tilde{W}_2$, and the FD compression basis indication in the matrix $W_f$. As discussed above, CSI feedback with the Type-II codebook improves the accuracy of spatial domain beams by generating the spatial beams via the linear combination of the grid beams in the pre-defined codebook.

After the compression, the linear combination coefficients may be quantized and reported. The quantization the entries in $\tilde{W}_2$ and basis vectors in $W_f$ may impact the feedback overhead, the accuracy of PMI feedback precoding matrix, and the performance of single-user (SU) or multi-user (MU) multiple-input multiple-output (MIMO) transmission. For each beam, the strongest coefficients may be reported with a higher resolution (e.g., using more bits), while other coefficients are reported with a lower resolution (e.g., using less bits). For example, for each layer the $\tilde{W}_2$ coefficients can be quantized by finding the column m* where the strongest coefficient $c_{i^*,m^*}$ lies. The UE can then report the index (i*, m*) of the strongest coefficient $c_{i^*,m^*}$. The UE can report all other coefficients $c_{i,m}*$ (i≠i*) in column m* using a higher resolution (e.g., 4-bit amplitude and 16PSK phase) and report all other coefficients (i.e., in the other columns) with a lower resolution (e.g., 3-bit amplitude and either 8PSK or 16PSK phase). The resolution may be configurable by the network. In some examples, for row i, i≠i*, the UE can report the strongest coefficient in row i, $c_{i,m}$ using a higher resolution (e.g., 4-bit amplitude and 16PSK phase) and also report the index m for row i. The UE can report all other coefficients (in other rows) with a lower resolution (e.g., 3-bit amplitude and either 8PSK or 16PSK phase), which may be configurable by the network.

To further reduce overhead, the UE may report the total number of non-zero coefficients in the first part of uplink control information (UCI). The reported number of non-zero coefficients indicates an actual number of reported coefficients, which may be smaller than the configured number of coefficients (e.g., $K'_0 \leq K_0$). The other coefficients (non-reported coefficients) may be zero. The payload of the second part UCI (containing the quantization) is dependent on the number of non-zero coefficients. Thus, the reported actual number of coefficients can determine/indicate the payload in the second part UCI. However, since a beam can be associated with no non-zero coefficient, then there is no strongest coefficient for that beam. In this case, the total number of strongest coefficients would vary given a certain total number of non-zero coefficients, leading to potential unequal quantization for different layers.

In an illustrative example, the total number of non-zero linear combination coefficients is sixteen (e.g., $K'_0=16$), the number of beams is eight (e.g., L=8), and each beam has 2 coefficients. In this example, the total payload for quantization would be 112 bits–8 strongest coefficients, one for each beam/row, with 8 bits per coefficient and 8 weak coefficients, and with 6 bits per coefficient ((8×8)+(8×6)=112 bits). In another example, one beam has 0 coefficients (i.e., a zero-beam) and one beam has 4 coefficients, while the other 6 beams have 2 coefficients. In this example, the total payload for quantization would be 110 bits ((7×8)+(9×6)=110 bits.

As discussed above, the UE may be configured with a maximum number of non-zero coefficients per layer, $K_0$, where, for each layer, the UE may not report a number of non-zero coefficients greater than $K_0$. In some examples, the $K_0$ is configured in the CSI report configuration. In some examples, the $K_0$ may be configured for up to rank-2.

For higher ranks (e.g., beyond rank-2), it may be desirable that the payload size may be comparable to the layer ranks. Thus, the total number of coefficients for the higher rank (e.g., rank-4) would be comparable to that of the lower rank (rank-2), even though the higher rank may use more layers than the lower rank.

Therefore, techniques are desired for coefficient reporting that may maintain a constant part two UCI payload size, as well as techniques for determining the maximum number of coefficients per layer for higher ranks.

Example Number of Non-Zero Coefficients Reporting for Type II CSI Codebook with Frequency Compression Aspects of the present disclosure provide for channel state information (CSI) linear combination coefficient reporting. In some examples, aspects may be used for a Type II CSI codebook with frequency compression.

According to certain aspects, a user equipment (UE) reports a total number of non-zero coefficients across all layers in a first part of uplink control information (UCI).

The UE may further determine and report a total number of zero beams across all layers in the first part UCI and/or the UE may include zero padding bits in a second part of the UCI. The padding bits may be based on the number of the zero beams. Thus, the UCI payload size can be kept constant, even when some beams do not have a strongest coefficient (i.e., zero beams).

Alternatively, the UE may further determine and report the total number of zero or non-zero beam across all layers and the second part of the UCI payload size is determined further based on the reported total number of zero or non-zero beams. In this case, the UE may not include the zero-padding bits in the second part of the UCI payload.

Figure 6:
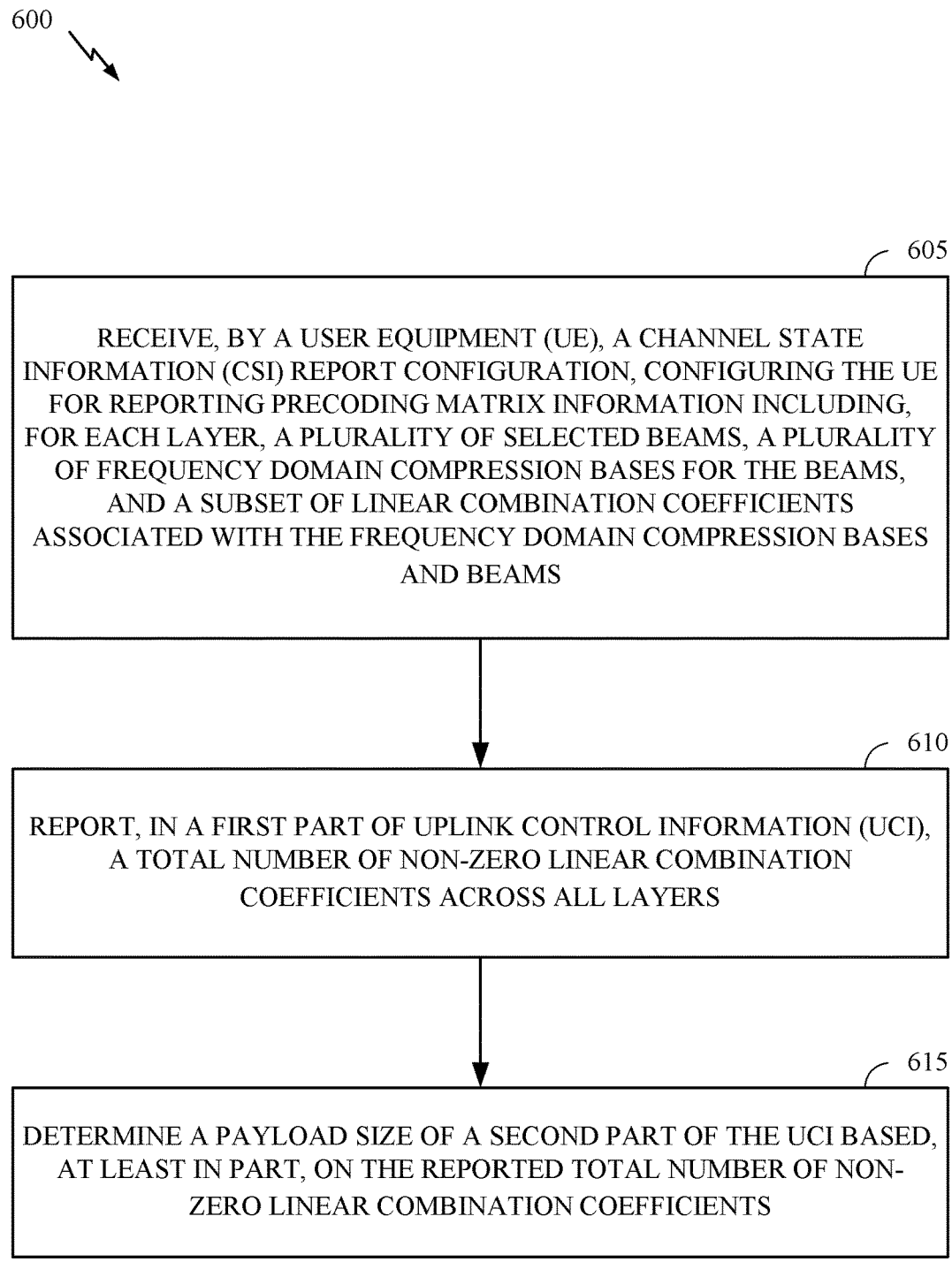
FIG. 6 is a flow diagram illustrating example operations for wireless communication by a UE, in accordance with certain aspects of the present disclosure.

FIG. 6 illustrates example operations 600 that may be performed by a UE. For example, the operations 600 may be performed by a UE 120 (e.g., the UE 120a) in the wireless communication network 100. Operations 600 may be implemented as software components that are executed and run on one or more processors (e.g., processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 600 may begin, at 605, by receiving a CSI report configuration. For example, as discussed above, the CSI report configuration may configure the UE for reporting precoding matrix information. The precoding matrix information may include, for each layer, a plurality of selected beams (e.g., L), a plurality of frequency domain compression bases (e.g., F) for the beams, and a subset of linear combination coefficients ($K_0$) associated with the frequency domain compression bases and beams.

In some examples, the CSI report configuration may configure the UE to report, for each layer, an index of a strongest linear combination coefficient. The UE may also report the linear combination coefficients associated with the same tap of the strongest linear combination coefficient (e.g., linear combination coefficients in the same column of the $\tilde{W}_2$ matrix as the strongest linear combination coefficients) using a first quantization level (e.g., 4-bit amplitude and 16 PSK phase) or the UE may report the linear combination coefficients associated with the same beam as the strongest linear combination coefficient (e.g., linear combination coefficients in the same row of the $\tilde{W}_2$ matrix) using the first quantization level. The UE may report the remaining linear combination coefficients (e.g., linear combination coefficients in the other rows or columns of the $\tilde{W}_2$ matrix) at a second quantization level, lower than the first quantization level (e.g., 3-bit amplitude and 8 PSK or 16 PSK phase).

In some examples, the UE finds and reports the strongest linear combination coeffiient index (i*, m*), and normalizes all other linear combination coefficients by it. For the polarization in which the strongest linear combination coefficient is found, the UE may report each element (with index i,m) p_{i,m} with B-bit amplitude. For the other polarization, each element is quantized to p0*p_{i,m}, where p0 is power offset relative to the polarization in which the strongest coefficient is found. The UE may quantize p0 with A-bit, and p_{i,m} with B-bit. For this scheme, if the second polarization has all zero-ceofficients, then the UE dose not report p0, and the payload of the second part UCI may have ambiguity because the total number of coefficients only may not be sufficient to solve the issue. The UE can report 1-bit per layer to indicate whether there is a polarization that has no non-zero coefficients.

At 610, the UE reports, in a first part of UCI, a total number of non-zero linear combination coefficients across all layers ($K_{tot}$). The reported total number of non-zero linear combination coefficients across all layers may be equal to or a subset of (e.g., less than) a total number of linear combination coefficients configured by the CSI report configuration ($K_{tot}$). In some examples, the total number of linear combination coefficients configured by the CSI report configuration ($K_{tot}$) may be equal to a product of the number of linear combination coefficients of the subset of linear combination coefficients ($k_0 \leq 2LM$, equal to the maximum number of linear combination coefficients the UE may report per layer) and a maximum rank ($RI_{max}$) or the maximum rank (i.e., the highest rank that can be reported) and an adjust ratio parameter ($\alpha_{RImax}$), for example $K_{tot}=K_0 \times RI_{max}$ or $K_{tot}=K_0 \times RI_{max} \times \alpha_{RI_{max}}$.

At 615, the UE determines a payload size of a second part of the UCI based, at least in part, on the reported total number of non-zero linear combination coefficients.

In some examples, the UE also reports, in the first part of the UCI, a total number of non-zero beams ($K_L$) across all layers and/or a total number of zero beams across all layers (from which the total number of non-zero beams cans be determined). The total number of zero beams across all layers and/or the total number of non-zero beams across all layers can be equal to, or a subset of (e.g., less than), a total number of the beams across all layers configured by the CSI report configuration. The total number of beams configured by the CSI report configuration may be equal to a product of two polarizations, the L beams per layer, and a maximum rank ($RI_{max}$). Thus, the total number of non-zero beams is $K_L \leq 2L \times RI_{max}$.

Thus, the payload size of the second part of the UCI can be determined based on both the reported total number of non-zero linear combination coefficients and the reported total number of zero beams (and/or based on the total number of non-zero beams).

In some examples, the determination of the payload size of the second part of the UCI is further based on one or more quantization levels used for reporting the linear combination coefficients. For example, the payload for quantization may be given by $K_L \times (A_1+P_1)+(K'_{tot}-K_L) \times (A_2+P_2)$, where $A_1$ is the number of bits used for amplitude quantization of the strongest linear combination coefficient per beam, $P_1$ is the number of bits used for phase quantization of the strongest linear combination coefficient per beam, $A_2$ is the number of bits used for amplitude quantization of other linear combination coefficients per beam, and $P_2$ is the number of bits used for phase quantization of other linear combination coefficients per beam.

In some examples, the UE may not report the total number of zero or non-zero beams across all layers. Instead, the UE may use padding bit(s) in the second part of the UCI payload. The number of the padding bit(s) included may be based on the number of the zero or non-zero beams.

In some examples, the UE may report a location of the non-zero linear combination coefficients via a bitmap (e.g., a 2LM bitmap). The total number of non-zero beams across all layers can be determined based on the bitmap. For example, if the there are no "1"s in the bitmap (e.g., a "1" indicating a non-zero linear combination coefficient) for a beam of a layer, then it can be determined as a zero beam. Then, the UE can determine the second part UCI payload based on the reported total number of non-zero coefficients, the determined total number of zero or non-zero beams, and the quantization levels used.

In some examples, the UE can determine the actual payload for quantization by $N'_{tot}=K_L \times (A_1+P_1)+(K'_{tot}-K_L) \times (A_2+P_2)$. The UE can determine the total configured payload based on the reported total number of non-zero coefficients, the quantization levels, and the reported rank. For example, the total configured payload for quantization may be given by $N_{tot}=2L \times RI \times (A_1+P_1)+(K'_{tot}-2L \times RI) \times (A_2+P_2)$. The UE can determine padding bit(s) to add to the UCI payload (e.g., to the end of the second part of the UCI payload) based on the difference between the total (configured) number of linear combination coefficients and the determined actual payload for quantization ($N_{tot}-N'_{tot}$). In this case, whether there are zero-beams or not, the payload of the second part of the UCI can always be the same, and only dependent on the actual total number of non-zero linear combination coefficients (e.g., no need to report number of non-zero beams in the first part UCI). Since the payload for the case with zero beams is smaller than the payload for the case without zero beams, the zero-padding bits may be added when there are zero beams, the number of zeros to be padded determined based on the number of zero beams.

Figure 7:
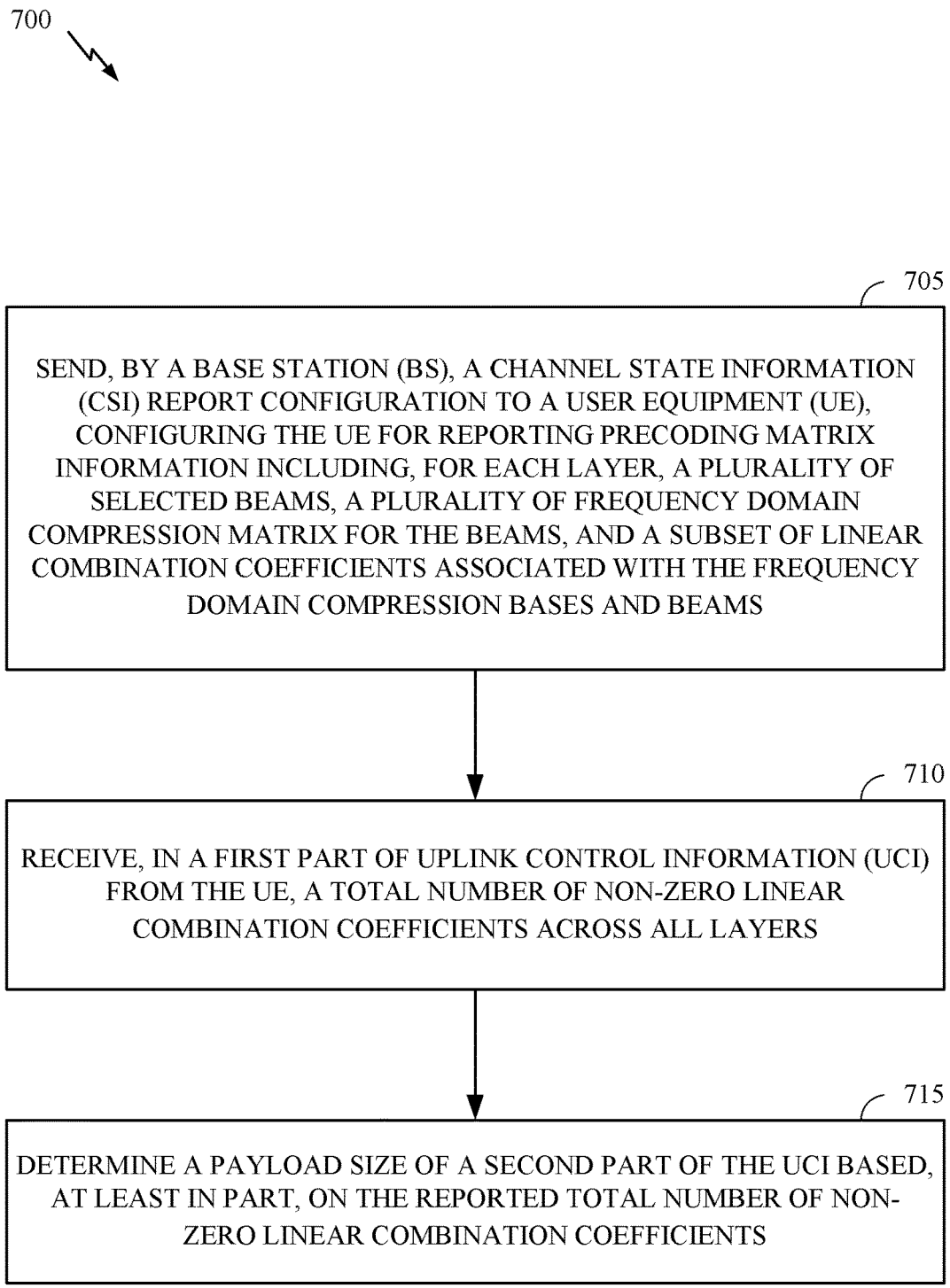
FIG. 7 is a flow diagram illustrating example operations for wireless communication by a BS, in accordance with certain aspects of the present disclosure.

FIG. 7 illustrates example operations 700 that may be performed by a BS. For example, the operations 700 may be performed by a BS 110 (e.g., the BS 110a) in the wireless communication network 100. The operations 700 may be complimentary operations by the BS to the operations 600 performed by the UE. Operations 700 may be implemented as software components that are executed and run on one or more processors (e.g., processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 700 may begin, at 705, by sending a CSI report configuration to the UE. The CSI report configuration configures the UE for reporting precoding matrix information. The precoding matrix information includes, for each layer, a plurality of selected beams, a plurality of frequency domain compression bases for the beams, and a subset of linear combination coefficients associated with the frequency domain compression bases and beams. The BS may configure, in the CSI report configuration, the maximum number of coefficients per layer ko, the maximum rank ($RI_{max}$), and/or the adjustment ratio parameter $\alpha_{RImax}$.

At 710, the BS receives, in a first part of UCI from the UE, an indication of a total number of non-zero linear combination coefficients across all layers. As discussed above, in some examples, the BS also receives, in the first part of the UCI, an indication of a total number of non-zero beams across all layers or a total number of zero beams across all layers.

At 715, the BS determines a payload size of a second part of the UCI based, at least in part, on the reported total numbers of non-zero linear combination coefficients. In some examples, the determination of the payload size of the second part of the UCI is further based on the reported total number of zero beams or non-zero beams. As discussed above, in some examples, the second part UCI includes zero-padding bits. For example, the BS may receive an indication of a location of the non-zero linear combination coefficients via a bitmap. The BS may determine a total number of non-zero beams across all layers based on the bitmap. The BS may determine the payload size of the second part of the UCI further based on the reported total number of zero beams or non-zero beams. The number of the zero-padding bits is based on a total number of zero beams or a total number of non-zero beams.

According to certain aspects, for higher ranks (e.g., ranks greater than rank-2) to have a comparable UCI payload size as the UCI payload size for lower ranks (e.g., up to rank 2), the number of linear combination coefficients per layer that the UE reports for the higher rank(s) may be lower than the number of linear combination coefficients per layer that the UE reports for the lower ranks. In some examples, the number of linear combination coefficients for a higher rank (e.g., such as rank-3 or rank-4) may be derived based on the number of per-layer linear combination coefficients for a lower rank. In some examples, the UE derives the number of linear combination coefficients based on an adjust ratio value. For example, the adjust ratio value may correspond to a ratio of the higher rank(s) to the lower rank(s). In some examples, the ratio may be configured by the network, preconfigured (e.g., specified in the wireless standards), or derived by the UE.

Figure 8:
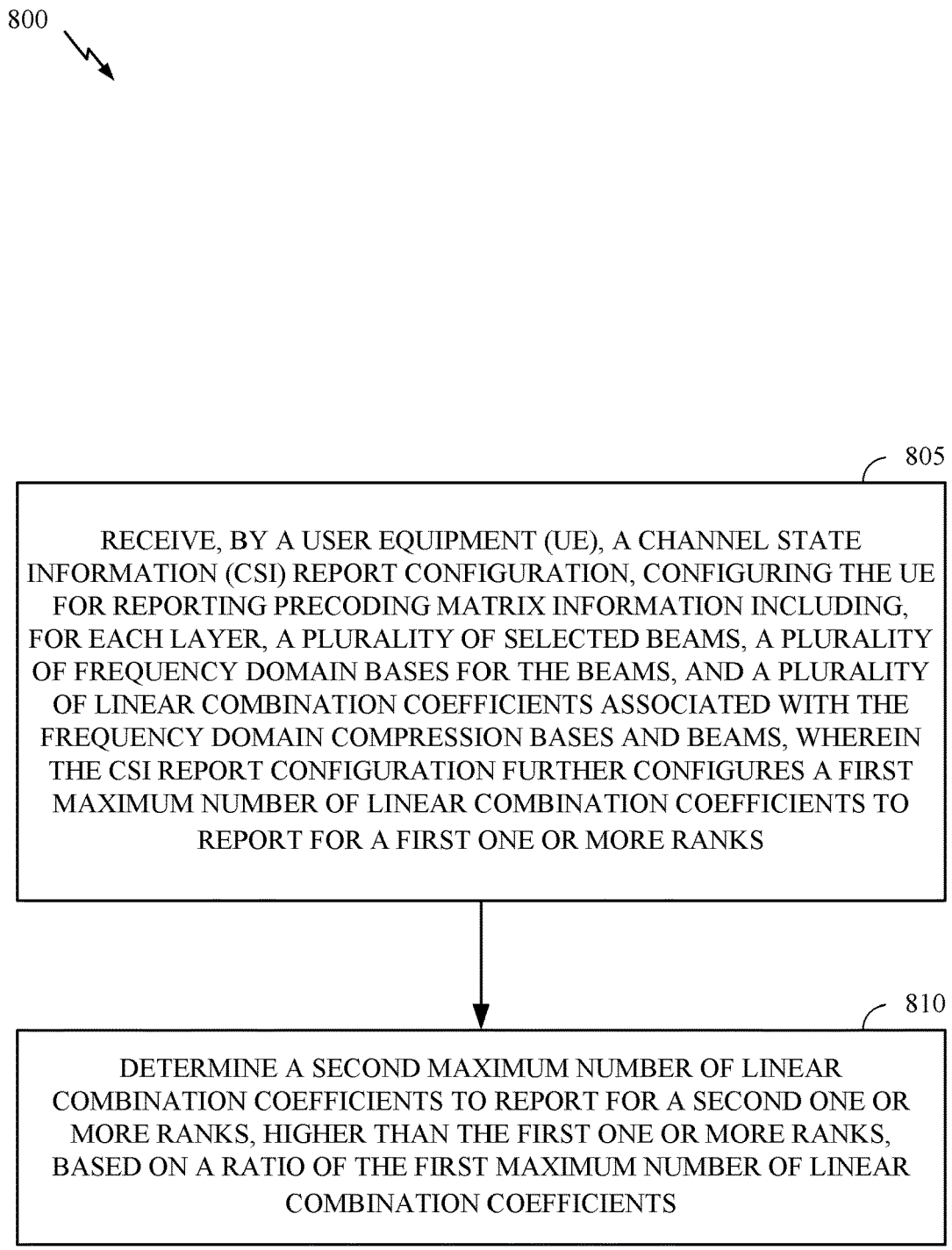
FIG. 8 is a flow diagram illustrating example operations for wireless communication by a UE, in accordance with certain aspects of the present disclosure.

FIG. 8 illustrates example operations 800 that may be performed by a UE. For example, the operations 800 may be performed by a UE 120 (e.g., the UE 120a) in the wireless communication network 100. Operations 800 may be implemented as software components that are executed and run on one or more processors (e.g., processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 800 may begin, at 805, by receiving a CSI report configuration. The CSI report configuration may configure the UE for reporting precoding matrix information. The precoding matrix information may include, for each layer, a plurality of selected beams (e.g., L which may have two polarizations), a plurality of frequency domain compression bases (e.g., F) for the beams, and a plurality of linear combination coefficients associated with the frequency domain compression bases and beams. The CSI report configuration may further configure a first maximum number (e.g., $k_0$) of linear combination coefficients to report for a first one or more ranks (e.g., up to rank-2). In some examples, the configured first maximum number of linear combination coefficients for the UE to report may be based on the per layer maximum number of linear combination coefficients for the UE to report, $k_0$.

At 810, the BS determines a second maximum number of linear combination coefficients to report for a second one or more ranks, higher than the first one or more ranks, based on a ratio (e.g., an adjust ratio value a) of the first maximum number of linear combination coefficients. For example, the first one or more ranks may be rank-1 and/or rank-2 and the second one or more ranks may be rank-3 and/or rank-4. The ratio may be the ratio of the number of coefficients per layer for the higher rank to the number of coefficients per-layer for the lower rank.

The UE can determine the number of coefficients per layer $K_0 \times \alpha$ (common for all layers). In some examples, the ratio is configured by the CSI report configuration. In some examples, the UE derives the ratio based on a reported rank (e.g., $\alpha_3$ for rank-3 ≥ $\alpha_4$ for rank-4). The second maximum number of linear combination coefficients per layer to report may be equal to a product of the second rank, the ratio, and the first maximum number of linear combination coefficients. In some examples, rank-r, the UE does not report a total number of coefficients across all layers greater than $K_0 \times \alpha_r \times r$. In some examples, for each layer or rank-r, the UE does not report a number of coefficients greater than $K_0 \times \alpha_r$. Thus, for example, the UE may be configured with $K_0$ the maximum number of coefficients to report per layer for rank 1 and/or or rank 2. For the higher ranks, such as rank 3 and/or rank 4, the UE may report a total maximum number of coefficients across all layers of 2 $K_0$ ($\alpha$=2). The UE may still report a maximum number of coefficient per layer of $K_0$ for rank 3 and/or rank 4.

In some examples, the UE reports, in a first part of the UCI, the actual total number of non-zero linear combination coefficients. A bitwidth used to report the total number of non-zero linear combination coefficients may be based on the adjust ratio value, $\alpha$, and the maximum rank. For example, the bitwidth used to report the actual number of non-zero coefficient may be dependent on the $\alpha_{RI_{max}}$ and $RI_{max} \lceil \log_2 K_{tot} \rceil$-bit, where $K_{tot} = K_0 \times RI_{max} \times \alpha_{RI_{max}}$.

Figure 9:
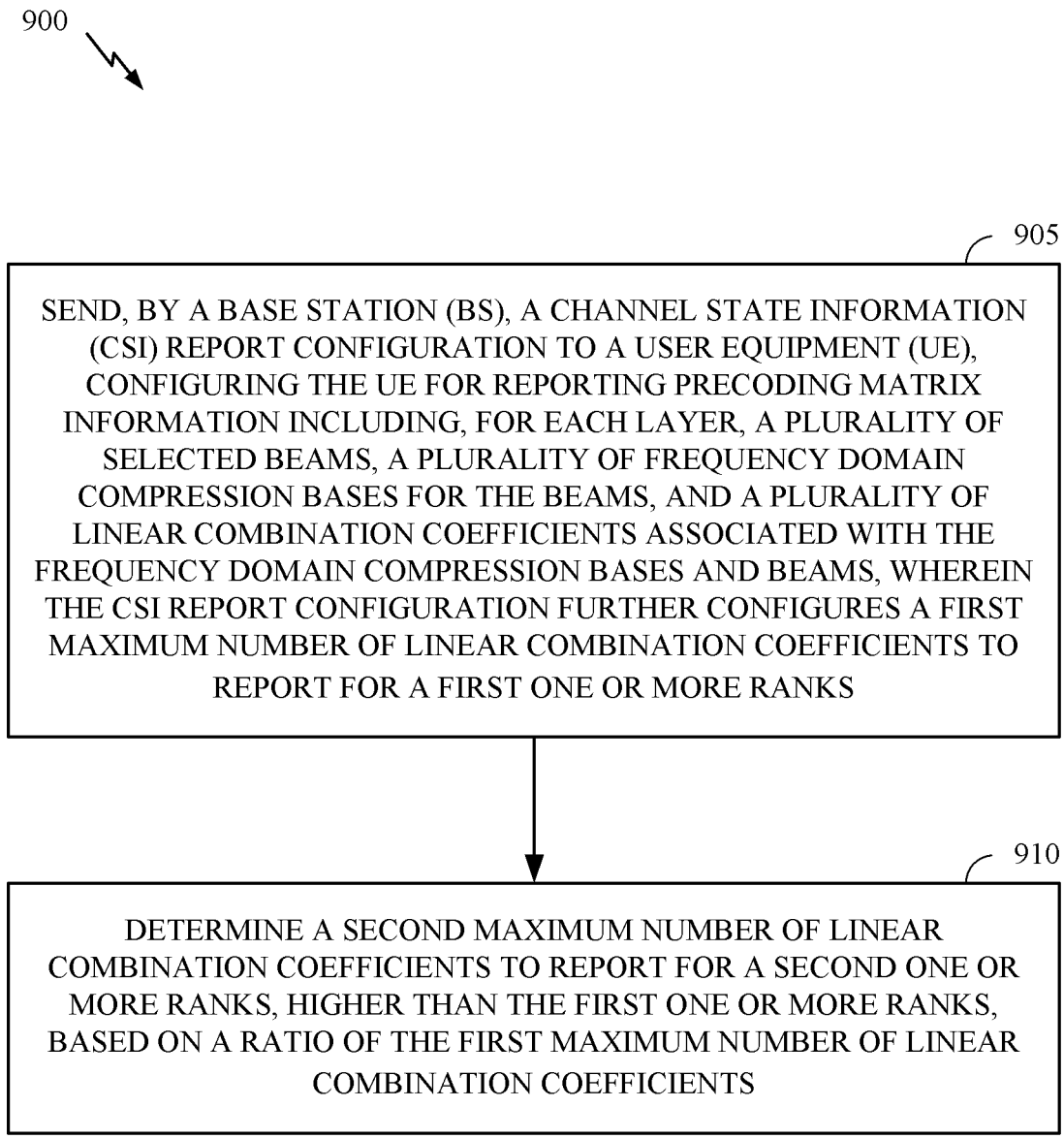
FIG. 9 is a flow diagram illustrating example operations for wireless communication by a BS, in accordance with certain aspects of the present disclosure.

FIG. 9 illustrates example operations 900 that may be performed by a BS. For example, the operations 900 may be performed by a BS 110 (e.g., the BS 110a) in the wireless communication network 100. The operations 900 may be complimentary operations by the BS to the operations 800 performed by the UE. Operations 900 may be implemented as software components that are executed and run on one or more processors (e.g., processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 900 may begin, at 905, by sending a CSI report configuration to a UE. The CSI report configuration configures the UE for reporting precoding matrix information including, for each layer, a plurality of selected beams, a plurality of frequency domain compression bases for the beams, and a plurality of linear combination coefficients associated with the frequency domain compression bases and beams. The CSI report configuration further configures a first maximum number of linear combination coefficients to report for a first one or more ranks.

At 910, the BS determines a second maximum number of linear combination coefficients for a second one or more ranks, higher than the first one or more ranks, based on a ratio of the first maximum number of linear combination coefficients. In some examples, the BS configures the ratio with the CSI report configuration. In some examples, the BS derives the ratio based on a rank reported by the UE. In some examples, the ratio is preconfigured (e.g., in the wireless standards).

Figure 10:
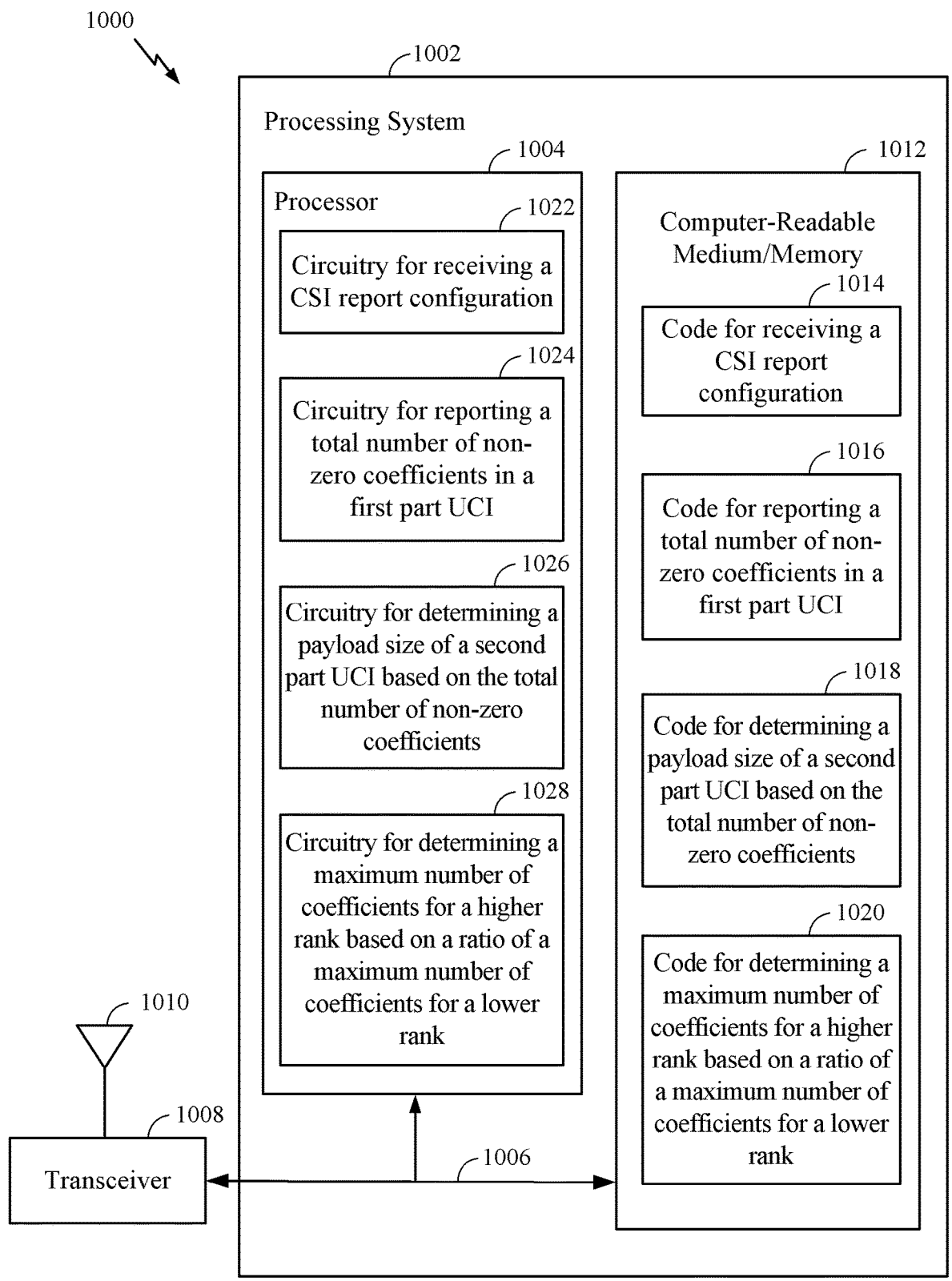
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 6 and/or FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6 and/or FIG. 8, or other operations for performing the various techniques discussed herein for number of non-zero coefficients reporting for CSI reporting with frequency compression. In certain aspects, computer-readable medium/memory 1012 stores code 1014 for receiving a CSI report configuration; code 1016 for reporting a total number of non-zero coefficients in a first part UCI; code 1018 for determining a payload size of a second part UCI based on the total number of non-zero coefficients; and/or code 1020 for determining a second maximum number of coefficients per-layer to report for a higher rank based on a ratio and a first maximum number of coefficients per-layer for a low rank. In certain aspects, the processor 1004 has circuitry configured to implement the code stored in the computer-readable medium/memory 1012. The processor 1004 includes circuitry 1022 for receiving a CSI report configuration; circuitry 1024 for reporting a total number of non-zero coefficients in a first part UCI; circuitry 1026 for determining a payload size of a second part UCI based on the total number of non-zero coefficients; and/or circuitry 1028 for determining a second maximum number of coefficients per-layer to report for a higher rank based on a ratio and a first maximum number of coefficients per-layer for a low rank.

Figure 11:
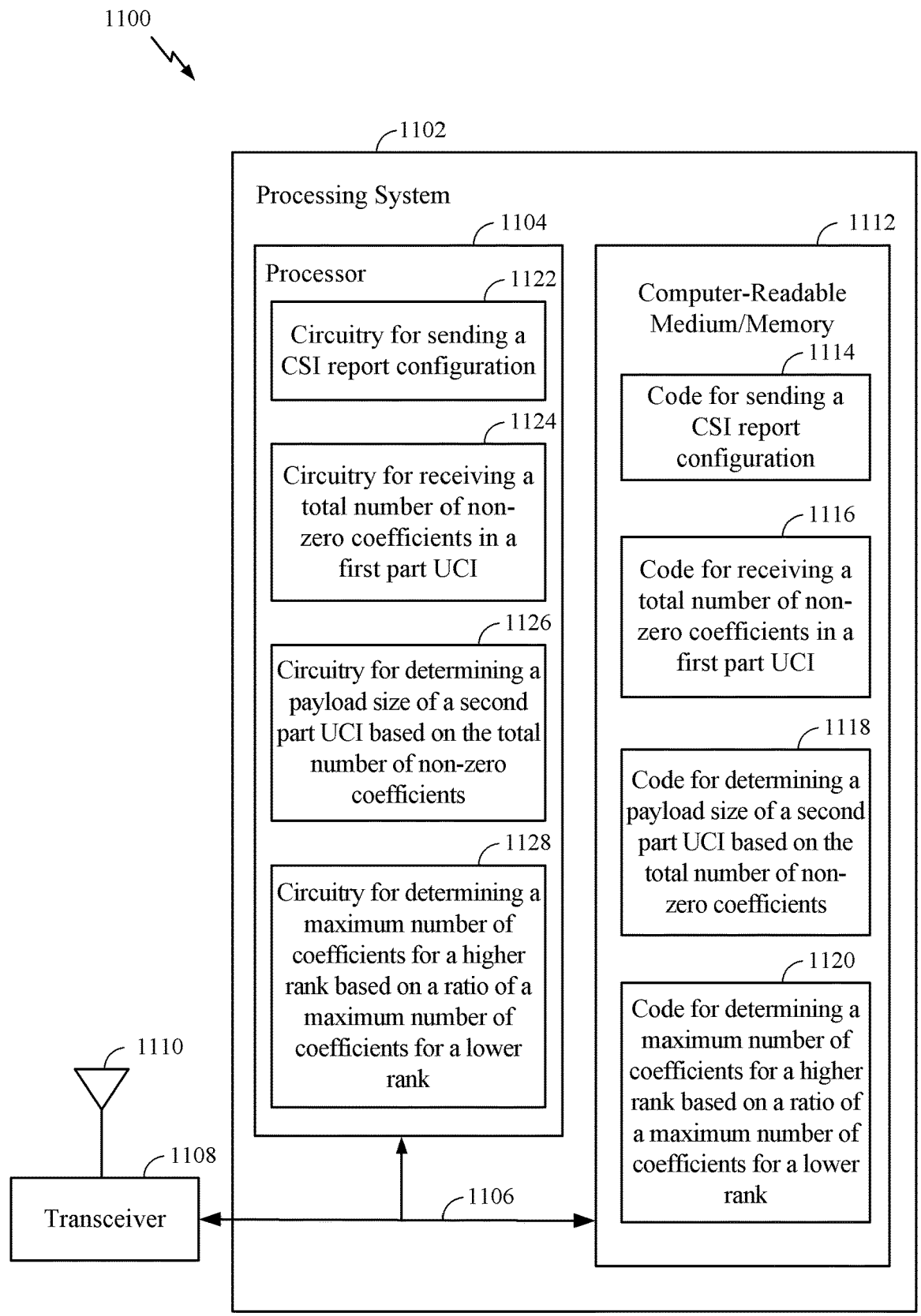
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 7 and/or FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 7 and/or FIG. 9, or other operations for performing the various techniques discussed herein for number of non-zero coefficients reporting for CSI reporting with frequency compression. In certain aspects, computer-readable medium/memory 1112 stores code 1114 for sending a CSI report configuration; code 1116 for receiving an indication of a total number of non-zero coefficients in a first part UCI; code 1118 for determining a payload size of a second part UCI based on the total number of non-zero coefficients; and/or code 1120 for determining a second maximum number of coefficients per-layer for a higher rank based on a ratio and a first maximum number of coefficients per-layer for a low rank. In certain aspects, the processor 1104 has circuitry configured to implement the code stored in the computer-readable medium/memory 1112. The processor 1104 includes circuitry 1122 for sending a CSI report configuration; circuitry 1124 for receiving an indication of a total number of non-zero coefficients in a first part UCI; circuitry 1126 for determining a payload size of a second part UCI based on the total number of non-zero coefficients; and/or circuitry 1128 for determining a second maximum number of coefficients per-layer to report for a higher rank based on a ratio and a first maximum number of coefficients per-layer for a low rank.

Number of Coefficient Reporting and Number Frequency Compression Bases

In certain systems, $N_{rb}$ is configured, where $N_{rb}$ is the number of resource blocks (RBs) in the configured bandwidth part (BWP). In some cases, if $N_{rb}<24$, then here is only one subband for CQI reporting, or $N_{sb}=1$, where $N_{sb}$ is the number of subbands for CQI reporting. If $N_{rb}>24$, there are multiple subbands for CQI reporting. The subband size is configured, and the total number of subbands for CQI reporting may range from 3 to 19 subbands. The actual number of subbands for CQI reporting $N_{sb}$ may be configured via a bitmap, for example, via a higher layer RRC parameter (e.g., csi-ReportingBand).

In certain systems, the number of PMIs per CQI subband, R, is configured by the network. The number of subbands for PMI reporting, N3, may be determined as follows: for subbands in the middle (e.g., not the first or the last subband), there are R subbands for PMI reporting; for the first and last subband, if the actual number of RBs iss less than the configured subband size/R, there is one subband for PMI reporting; and if the actual number of RBs≥the configured subband size/R, there are R subbands for PMI reporting. N3 can range from 1 to 37.

In certain systems, the number of FD bases for each layer of rank-v (denoted $M_v$), $M_v$=ceil(N3/R*pv), where pv is a ratio value (e.g., ⅛, ¼, or ½) that may be configured to determine $M_v$ for rank-v.

In certain systems, a first number (e.g., configured) number of non-zero coefficients per layer, $K_0$ may be $K_0$=ceil (M1*beta), where M1=ceil(N3/R*p1), where the beta parameter is a ratio (e.g., 0.25, 0.5, 0.75) configured to determine $K_0$. Thus, in certain systems (e.g., Release-15 systems), there is only one subband when $N_{rb}$<24 (e.g., the UE only reports one. A CSI may include a precoder with L=4, however, in certain systems (e.g., Release-16 systems) with frequency domain compression a CSI may include a precoder with L=3 even though L=4 is configured (e.g., because the beta value is at most ¾). The performance of the CSI in this case may be worse than the CSI performance for a system without FD compression. Thus, for the case of when $N_r$<24 (1 subband), with FD compression L=4, M=1 and $K_0$=6, while for when $N_{rb}$>24 and csi-ReportingBand contains only a single "1" (i.e., 1 subband), then L=4, M=1 and $K_0$=6; and for $N_{rb}$>24 and csi-ReportingBand contains two "1"s (i.e., 2 subbands), then L=4, M=1 and $K_0$=6. This means that with FD compression the UE reports a single precoder with 6 NZC for two subbands, while without FD compression the UE may report two precoders with 8 NZC each for two subbands. Thus, the performance with FD compression could be worse than the performance without FD compression.

Therefore, it may be desirable to avoid FD compression by setting compression ratio, pv and/or beta parameters equal to 1.

According to certain aspects, when $N_{rb}$<24, pv=1 for v=1, 2, 3, 4 and/or beta=1 and when $N_{rb}$>24, pv and beta are based on configuration.

According to certain aspects, when $N_{sb}$≤X, pv=1 for v=1, 2, 3, 4 and/or beta=1 and when $N_{sb}$>X pv and beta are based on configuration, where X=1 or 2 or 3 or 4.

According to certain aspects, when N3/R<=Y, pv=1 for v=1, 2, 3, 4 and/or beta=1 and when N3/R>Y, pv and beta are based on configuration, where Y=1 or 2.

According to certain aspects, when M1≤Z, beta=1 and when M1>Z, beta is based on configuration, where Y=1 or 2.

Example Aspects

In a first aspect, a method for wireless communication by a user equipment (UE), includes receiving a channel state information (CSI) report configuration, configuring the UE for reporting precoding matrix information including, for each layer, a plurality of selected beams, a plurality of frequency domain bases for the beams, and a plurality of linear combination coefficients associated with the frequency domain bases and beams, wherein the CSI report configuration further configures a first maximum number of linear combination coefficients to report for a first one or more ranks; and determining a second maximum number of linear combination coefficients to report for a second one or more ranks, higher than the first one or more ranks, based on a ratio of the first maximum number of linear combination coefficients.

In a second aspect, in combination with the first aspect, the first maximum number of linear combination coefficients is a maximum number of coefficients per layer to report; and the second maximum number of coefficients to report is a total number of linear combination coefficients across all layers to report.

In a third aspect, in combination with one or more of the first and second aspects, the first one or more ranks includes rank 1 and rank 2; and the second one or more ranks includes at least one of: rank 3 or rank 4.

In a fourth aspect, in combination with one or more of the first through third aspects, the ratio is configured by the CSI report configuration or preconfigured.

In a fifth aspect, in combination with one or more of the first through fourth aspects, the UE derives the ratio based on a reported rank.

In a sixth aspect, in combination with one or more of the first through fifth aspects, the second maximum number of linear combination coefficients to report is equal to a product of the second rank, the ratio, and the first maximum number of linear combination coefficients.

In a seventh aspect, in combination with one or more of the first through sixth aspects, the UE reports, in a first part of uplink control information (UCI), an actual total number of reported non-zero linear combination coefficients, wherein a bitwidth used to report the actual total number of reported non-zero linear combination coefficients is based on the ratio and a maximum rank.

In an eighth aspect, in combination with one or more of the first through seventh aspects, the UE reports, in a first part of uplink control information (UCI), an actual total number of non-zero linear combination coefficients across all layers; and determines a payload size of a second part of the UCI based, at least in part, on the reported actual total number of non-zero coefficients.

In a ninth aspect, in combination with one or more of the first through eighth aspects, the UE reports, in the first part of the UCI, a total number of non-zero beams across all layers or a total number of zero beams across all layers, wherein the determination of the payload size of the second part of the UCI is further based on the reported total number of zero beams or non-zero beams.

In a tenth aspect, in combination with one or more of the first through ninth aspects, reporting the total number of non-zero beams or the total number of zero beams includes reporting a total number of non-zero polarizations across all layers and a total number of zero polarizations across all layers; a non-zero polarization across all layers indicates that all beams associated the corresponding polarization are non-zero beams; and a zero polarization across all layers indicates that all beams associated with the corresponding polarization are zero beams.

In an eleventh aspect, in combination with one or more of the first through tenth aspects, the determination of the payload size is further based on one or more quantization levels used for reporting the linear combination coefficients.

In a twelfth aspect, in combination with one or more of the first through eleventh aspects, the CSI report configuration configures the UE to report, for each layer, an index of the strongest linear combination coefficient and at least one of: the linear combination coefficients associated with the same tap of the strongest linear combination coefficient, the strongest linear combination coefficients associated with each beam, or the strongest linear combination coefficients associated with the same polarization at a first quantization level, and the remaining linear combination coefficients at a second quantization level, lower than the first quantization level.

In a thirteenth aspect, in combination with one or more of the first through twelfth aspects, the UE reports a location of the non-zero linear combination coefficients per layer via a bitmap.

In a fourteenth aspect, in combination with one or more of the first through thirteenth aspects, the UE adds zero-padding bits to the payload of the second part of the UCI.

In a fifteenth aspect, in combination with one or more of the first through fourteenth aspects, a number of the zero-padding bits is based on a total number of zero beams or a total number of non-zero beams.

In a sixteenth aspect, in combination with one or more of the first through fifteenth aspects, a number of the zero-padding bits is equal to a difference between the determined payload size and a configured payload size.

In a seventeenth aspect, in combination with one or more of the first through sixteenth aspects, the UE determines the first number of maximum number of linear combination coefficients is equal to a first value when a total number of subbands configured for channel quality indicator (CQI) CSI feedback is above a threshold, a total number of resource blocks (RBs) in a configured bandwidth part (BWP) is above a threshold, a ratio between a number of subbands for PMI reporting and a configured number of PMIs per CQI reporting subband is above a threshold, a number of the frequency domain bases is above a threshold, or a combination thereof; and determines the first maximum number of coefficients equal to a second value when the total number of subbands configured for CQI CSI feedback is equal to or below the threshold, the total number of RBs in the configured BWP is equal to or below the threshold, the ratio between the number of subbands for PMI reporting and the configured number of PMIs per CQI reporting subband is equal to or below the threshold, the number of the frequency domain bases is equal to or below threshold, or a combination thereof In an eighteenth aspect, in combination with one or more of the first through seventeenth aspects, the UE determines the number of frequency domain bases is equal to a first value when a total number of subbands configured for channel quality indicator (CQI) CSI feedback is above a threshold, a total number of resource blocks (RBs) in a configured bandwidth part (BWP) is above a threshold, a ratio between a number of subbands for PMI reporting and a configured number of PMIs per CQI reporting subband is above a threshold, a number of the frequency domain bases is above a threshold, or a combination thereof; and determines the number of frequency domain bases is equal to a second value when the total number of subbands configured for CQI CSI feedback is equal to or below the threshold, the total number of RBs in the configured BWP is equal to or below the threshold, the ratio between the number of subbands for PMI reporting and the configured number of PMIs per CQI reporting subband is equal to or below the threshold, the number of the frequency domain bases is equal to or below threshold, or a combination thereof In a nineteenth aspect, a method for wireless communication by a base station (BS) includes sending a channel state information (C SI) report configuration to a user equipment (UE), configuring the UE for reporting precoding matrix information including, for each layer, a plurality of selected beams, a plurality of frequency domain compression bases for the beams, and a plurality of linear combination coefficients associated with the frequency domain compression bases and beams, wherein the CSI report configuration further configures a first maximum number of linear combination coefficients to report for a first one or more ranks; and determining a second maximum number of linear combination coefficients for a second one or more ranks, higher than the first one or more ranks, based on a ratio of the first maximum number of linear combination coefficients.

In a twentieth aspect, in combination with the nineteenth aspect, the first maximum number of linear combination coefficients includes a maximum number of coefficients per layer to report; and the second maximum number of coefficients to report comprises a total number of linear combination coefficients across all layers to report.

In a twenty-first aspect, in combination with one or more of the nineteenth and twentieth aspects, the first one or more ranks include rank 1 and rank 2; and the second one or more ranks includes at least one of: rank 3 or rank 4.

In a twenty-second aspect, in combination with one or more of the nineteenth through twenty-first aspects, the ratio is configured by the CSI report configuration or preconfigured.

In a twenty-third aspect, in combination with one or more of the nineteenth through twenty-second aspects, the BS derives the ratio based on a reported rank.

In a twenty-fourth aspect, in combination with one or more of the nineteenth through twenty-third aspects, the second maximum number of linear combination coefficients to report is equal to a product of the second rank, the ratio, and the first maximum number of linear combination coefficients.

In a twenty-fifth aspect, in combination with one or more of the nineteenth through twenty-fourth aspects, the BS receives, in a first part of uplink control information (UCI) from the UE, an actual total number of non-zero linear combination coefficients reported by the UE, wherein a bitwidth used to report the actual total number of non-zero linear combination coefficients is based on the ratio and a maximum rank.

In a twenty-sixth aspect, in combination with one or more of the nineteenth through twenty-fifth aspects, the BS receives, in a first part of uplink control information (UCI) from the UE, an indication of an actual total number of non-zero linear combination coefficients across all layers reported by the UE; and determines a payload size of a second part of the UCI based, at least in part, on the reported actual total number of non-zero coefficients.

In a twenty-seventh aspect, in combination with one or more of the nineteenth through twenty-sixth aspects, the BS receives, in the first part of the UCI, an indication of a total number of non-zero beams across all layers or a total number of zero beams across all layers, wherein the determination of the payload size of the second part of the UCI is further based on the reported total number of zero beams or non-zero beams.

In a twenty-eighth aspect, in combination with one or more of the nineteenth through twenty-seventh aspects, the indication of the total number of non-zero beams or the total number of zero beams includes a total number of non-zero polarizations across all layers and a total number of zero polarizations across all layers; a non-zero polarization across all layers indicates that all beams associated the corresponding polarization are non-zero beams; and a zero polarization across all layers indicates that all beams associated with the corresponding polarization are zero beams.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR, Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an LTE or LTE-A network, a set of one or more BSs may define an eNodeB (eNB). In other examples (e.g., in NR), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU). In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communication by a user equipment (UE), the method comprising:
   receiving a channel state information (CSI) report configuration configuring the UE for reporting precoding matrix information, wherein the CSI report configuration includes, for each layer, a plurality of selected beams, a plurality of frequency domain bases for the plurality of selected beams, a plurality of linear combination coefficients associated with the plurality of frequency domain bases and the plurality of selected beams, and a maximum number of non-zero linear combination coefficients per layer to report for a first one or more ranks; and
   determining a maximum total number of non-zero linear combination coefficients across all layers to report for a second one or more ranks, higher than the first one or more ranks, based on a preconfigured ratio of the maximum number of non-zero linear combination coefficients per layer.

2. The method of claim 1, wherein:
   the first one or more ranks comprise rank 1 and rank 2; and
   the second one or more ranks comprises at least one of: rank 3 or rank 4.

3. The method of claim 1, wherein, for a second rank of the second one or more ranks, the total number of linear combination coefficients across all layers to report is equal to a product of the second rank, the preconfigured ratio, and the maximum number of non-zero linear combination coefficients per layer.

4. The method of claim 1, further comprising reporting, in a first part of uplink control information (UCI), an actual total number of reported non-zero linear combination coefficients, wherein a bitwidth used to report the actual total number of reported non-zero linear combination coefficients is based on the preconfigured ratio and a maximum rank.

5. The method of claim 1, further comprising:
   reporting, in a first part of uplink control information (UCI), an actual total number of non-zero linear combination coefficients across all layers; and
   determining a payload size of a second part of the UCI based, at least in part, on the reported actual total number of non-zero linear combination coefficients across all layers.

6. The method of claim 5, further comprising reporting, in the first part of the UCI, a total number of non-zero beams across all layers or a total number of zero beams across all layers, wherein the determination of the payload size of the second part of the UCI is further based on the reported total number of zero beams across all layers or the reported total number of non-zero beams across all layers.

7. The method of claim 5, wherein:
   reporting the total number of non-zero beams across all layers or the total number of zero beams across all layers comprises reporting a total number of non-zero polarizations across all layers and a total number of zero polarizations across all layers;
   a non-zero polarization across all layers indicates that all beams associated the corresponding polarization are non-zero beams; and
   a zero polarization across all layers indicates that all beams associated with the corresponding polarization are zero beams.

8. The method of claim 5, wherein the determination of the payload size is further based on one or more quantization levels used for reporting the non-zero linear combination coefficients.

9. The method of claim 5, wherein the CSI report configuration configures the UE to report, for each layer, an index of a strongest linear combination coefficient and at least one of: linear combination coefficients associated with a same tap of the strongest linear combination coefficient, one or more strongest linear combination coefficients associated with each beam, or the one or more strongest linear combination coefficients associated with a same polarization at a first quantization level and remaining linear combination coefficients at a second quantization level lower than the first quantization level.

10. The method of claim 1, further comprising reporting a location of the non-zero linear combination coefficients per layer via a bitmap.

11. The method of claim 5, further comprising adding zero-padding bits to a payload of the second part of the UCI.

12. The method of claim 11, wherein a number of the zero-padding bits is based on a total number of zero beams or a total number of non-zero beams.

13. The method of claim 12, wherein a number of the zero-padding bits is equal to a difference between the determined payload size and a configured payload size.

14. The method of claim 1, further comprising:
    determining the maximum number of non-zero linear combination coefficients per layer is equal to a first value when a total number of subbands configured for channel quality indicator (CQI) CSI feedback is above a threshold, a total number of resource blocks (RBs) in a configured bandwidth part (BWP) is above a threshold, a ratio between a number of subbands for PMI reporting and a configured number of PMIs per CQI reporting subband is above a threshold, a number of the frequency domain bases is above a threshold, or a combination thereof; and
    determining the maximum number of non-zero linear combination coefficients per layer is equal to a second value when the total number of subbands configured for CQI CSI feedback is equal to or below the threshold, the total number of RBs in the configured BWP is equal to or below the threshold, the ratio between the number of subbands for PMI reporting and the configured number of PMIs per CQI reporting subband is equal to or below the threshold, the number of the frequency domain bases is equal to or below threshold, or a combination thereof.

15. The method of claim 1, further comprising:
    determining the number of frequency domain bases is equal to a first value when a total number of subbands configured for channel quality indicator (CQI) CSI feedback is above a threshold, a total number of resource blocks (RBs) in a configured bandwidth part (BWP) is above a threshold, a ratio between a number of subbands for PMI reporting and a configured number of PMIs per CQI reporting subband is above a threshold, a number of the frequency domain bases is above a threshold, or a combination thereof; and
    determining the number of frequency domain bases is equal to a second value when the total number of subbands configured for CQI CSI feedback is equal to or below the threshold, the total number of RBs in the configured BWP is equal to or below the threshold, the ratio between the number of subbands for PMI reporting and the configured number of PMIs per CQI reporting subband is equal to or below the threshold, the number of the frequency domain bases is equal to or below threshold, or a combination thereof.

16. A method for wireless communication by a base station (BS), the method comprising:
sending a channel state information (CSI) report configuration to a user equipment (UE) configuring the UE for reporting precoding matrix information, wherein the CSI reporting configuration includes, for each layer, a plurality of selected beams, a plurality of frequency domain compression bases for the beams, a plurality of linear combination coefficients associated with the plurality of frequency domain compression bases and the plurality of selected beams, and a maximum number of non-zero linear combination coefficients per layer to report for a first one or more ranks; and
determining a maximum total number of non-zero linear combination coefficients across all layers to report for a second one or more ranks, higher than the first one or more ranks, based on a preconfigured ratio of the maximum number of non-zero linear combination coefficients per layer.

17. The method of claim 16, wherein:
the first one or more ranks comprise rank 1 and rank 2; and
the second one or more ranks comprises at least one of: rank 3 or rank 4.

18. The method of claim 16, wherein, for a second rank of the second on or more ranks, the maximum total number of non-zero linear combination coefficients across all layers to report is equal to a product of the second rank, the preconfigured ratio, and the maximum number of non-zero linear combination coefficients per layer.

19. The method of claim 16, further comprising receiving, in a first part of uplink control information (UCI) from the UE, an actual total number of non-zero linear combination coefficients reported by the UE, wherein a bitwidth used to report the actual total number of non-zero linear combination coefficients is based on the preconfigured ratio and a maximum rank.

20. The method of claim 16, further comprising:
receiving, in a first part of uplink control information (UCI) from the UE, an indication of an actual total number of non-zero linear combination coefficients across all layers reported by the UE; and
determining a payload size of a second part of the UCI based, at least in part, on the reported actual total number of non-zero linear combination coefficients across all layers.

21. The method of claim 20, further comprising receiving, in the first part of the UCI, an indication of a total number of non-zero beams across all layers or a total number of zero beams across all layers, wherein the determination of the payload size of the second part of the UCI is further based on the reported total number of zero beams across all layers or the reported total number of non-zero beams across all layers.

22. The method of claim 21, wherein:
the indication of the total number of non-zero beams across all layers or the total number of zero beams across all layers comprises a total number of non-zero polarizations across all layers and a total number of zero polarizations across all layers;
a non-zero polarization across all layers indicates that all beams associated the corresponding polarization are non-zero beams; and
a zero polarization across all layers indicates that all beams associated with the corresponding polarization are zero beams.

23. An apparatus for wireless communication, the apparatus comprising:
a receiver configured to receive a channel state information (CSI) report configuration configuring the apparatus for reporting precoding matrix information, wherein the CSI report configuration includes, for each layer, a plurality of selected beams, a plurality of frequency domain compression bases for the beams, a plurality of linear combination coefficients associated with the plurality of frequency domain compression bases and the plurality of selected beams, and a maximum number of non-zero linear combination coefficients per layer to report for a first one or more ranks; and
at least one processor coupled with a memory and configured to determine a maximum total number of non-zero linear combination coefficients across all layers to report for a second one or more ranks, higher than the first one or more ranks, based on a preconfigured ratio of the configured maximum number of non-zero linear combination coefficients per layer.

24. An apparatus for wireless communication, the apparatus comprising:
a transmitter configured to send a channel state information (CSI) report configuration to a user equipment (UE) configuring the UE for reporting precoding matrix information, wherein the CSI report configuration includes, for each layer, a plurality of selected beams, a plurality of frequency domain compression bases for the beams, a plurality of linear combination coefficients associated with the plurality of frequency domain compression bases and the plurality of selected beams, and a maximum number of non-zero linear combination coefficients per layer to report for a first one or more ranks; and
at least one processor coupled with a memory and configured to determine a maximum total number of non-zero linear combination coefficients across all layers to report for a second one or more ranks, higher than the first one or more ranks, based on a preconfigured ratio of the configured maximum number of non-zero linear combination coefficients per layer.

25. The method of claim 1, further comprising determining a number of the plurality of frequency domain bases based on a ratio of a number of subbands for reporting the precoding matrix information.

* * * * *